United States Patent [19]

Nagamine

[11] Patent Number: 5,343,352

[45] Date of Patent: Aug. 30, 1994

[54] INTEGRATED CIRCUIT HAVING TWO CIRCUIT BLOCKS ENERGIZED THROUGH DIFFERENT POWER SUPPLY SYSTEMS

[75] Inventor: Hisayuki Nagamine, Tokyo, Japan

[73] Assignee: NEC Corporation, Japan

[21] Appl. No.: 38,556

[22] Filed: Mar. 26, 1993

Related U.S. Application Data

[63] Continuation of Ser. No. 956,590, Oct. 5, 1992, abandoned, which is a continuation of Ser. No. 789,620, Nov. 8, 1991, abandoned, which is a continuation of Ser. No. 467,949, Jan. 22, 1990, abandoned.

[30] Foreign Application Priority Data

Jan. 20, 1989 [JP] Japan ................................... 1-12809

[51] Int. Cl.⁵ .............................................. H02H 9/04
[52] U.S. Cl. ......................................... 361/56; 361/54; 361/91; 361/111
[58] Field of Search ....................... 361/54, 56, 91, 111; 307/304, 443, 542, 565, 568

[56] References Cited

U.S. PATENT DOCUMENTS 4,855,863  8/1989  Yoshitake .............................. 361/91
4,996,626  2/1991  Say ....................................... 361/91

*Primary Examiner*—Steven L. Stephan
*Assistant Examiner*—Adolf Berhane
*Attorney, Agent, or Firm*—Laff, Whitesel, Conte & Saret

[57] ABSTRACT

A semiconductor integrated circuit employing a separate voltage supplying system in which a first circuit block is energized through a power supply line and a second circuit block is energized through another power supply line and provided with an improved protection circuit for the first circuit block is disclosed. The improved protection circuit includes a first discharge circuit for operatively discharging abnormal electrostatic charges at a signal line connected to the first circuit block to one power supply line and a second discharge circuit for operatively discharging abnormal electrostatic charges at the signal wiring to another power supply line.

2 Claims, 2 Drawing Sheets

INTEGRATED CIRCUIT HAVING TWO CIRCUIT BLOCKS ENERGIZED THROUGH DIFFERENT POWER SUPPLY SYSTEMS

This application is a continuation, of application Ser. No. 07/956,590 now abandoned, filed Oct. 5, 1992 which was a continuation of Ser. No. 07/789,620 filed Nov. 8, 1991 now abandoned which was a continuation Ser. No. 07/467,949 filed Jan. 22, 1990, now abandoned.

BACKGROUND OF THE INVENTION

1. Field of the Invention

The present invention relates to a semiconductor integrated circuit having at least two circuit blocks which are independently energized through different power supply systems and, more particularly to a protection circuit against an application of abnormally large electrostatic voltage to an external signal terminal.

2. Description of the Related Art

In a semiconductor integrated circuit having at least two circuit blocks each having MOS field effect transistors, a power supply is performed to energize the respective circuit blocks through different power supply systems in which different power supply lines are allocated to the respective circuit blocks and formed on the same integrated circuit chip. This structure is advantageous in suppressing noise on a power wiring that is generated by a change in current caused by change in number of circuits formed on the same chip. The separated power supply terminals ensure the independency of the respective current flow through each power supply wiring to prevent or reduce the voltage change on the power supply wiring based on a change in the current.

In the integrated circuit employing the above separated power supplying structure, an external signal terminal of one circuit block is provided with a protection circuit which is coupled to at least one of a high power voltage terminal and a low power voltage terminal that are connected to the same circuit block. The protection circuit discharges abnormally large electrostatic charges applied to the external signal terminal to the high power voltage terminal or the low voltage terminal through the corresponding power wiring when the voltage terminals associated with this circuit block are connected to power voltage sources, and to a stray capacitance of the power wiring when the associated power voltage terminals are not connected to the power voltage sources. However, the amount of the stray capacitance of the respective power wirings in the separated power supplying structure is remarkably small as compared with the power wirings in the conventional single power supplying structure employing the same power supply wiring for all the circuit blocks. Therefore, if abnormal electrostatic charges are applied to an external signal terminal of one circuit block when the power voltage terminals associated therewith are not connected to power sources, it is difficult to discharge the electrostatic charges to the stray capacitance of the associated power wiring sufficiently, resulting in destruction of a transistor, particularly a gate insulating film thereof in the above one circuit block.

SUMMARY OF THE INVENTION

An object of the present invention is to provide a semiconductor integrated circuit having two sets of power supplying structure for different circuit blocks on a single semiconductor chip, provided with an improved protection circuit against abnormal electrostatic charges applied to an external signal terminal.

A semiconductor integrated circuit according to the present invention comprises first and second high voltage terminals, first and second low voltage terminals. First and second high voltage wirings connected to the first and second high voltage terminals, respectively. First and second low voltage are connected to the first and second low voltage terminals, respectively. An external signal terminal has a signal wiring connected to the external signal terminal. A first circuit block is coupled to the first high voltage wiring and to the first low voltage wiring in order to be energized thereby and further coupled to the signal wiring. A second circuit block is connected to the second high voltage wiring and to the second low voltage wiring in order to be energized thereby. A first protection circuit is coupled between the signal wiring and at least one of the first high voltage wiring and the first low voltage wiring. The first protection circuit operatively discharges abnormally large electrostatic charges applied to the external signal terminal, the discharge being to the at least one of the first high voltage wiring and the first low voltage wiring. A second protection circuit is coupled to the signal wiring and at least one of the second high voltage wiring and the second low voltage wiring. The second protection circuit operatively discharges abnormally large electrostatic charges applied to the external signal terminal, the discharge being to the at least one of the second high voltage wiring and the second low voltage wiring.

According to the present invention, abnormally large electrostatic charges applied to the signal wiring are discharged by both of the first and second protection circuits through the first high or low voltage wiring and the second high or low voltage wiring in parallel. Therefore, the effective discharging ability of the abnormally large charges is remarkably increased. Particularly, when no power source is connected to the voltage terminals, such abnormal charges are effectively absorped by capacitances of the first high or low voltage wiring and the second high or low voltage wiring.

BRIEF DESCRIPTION OF THE DRAWINGS

The above and further objects, features and advantages of the present invention will become more apparent from the following detailed description taken in conjunction with the accompanying drawings, wherein.

DETAILED DESCRIPTION OF THE INVENTION

Description of the Prior Art

Figure 1:
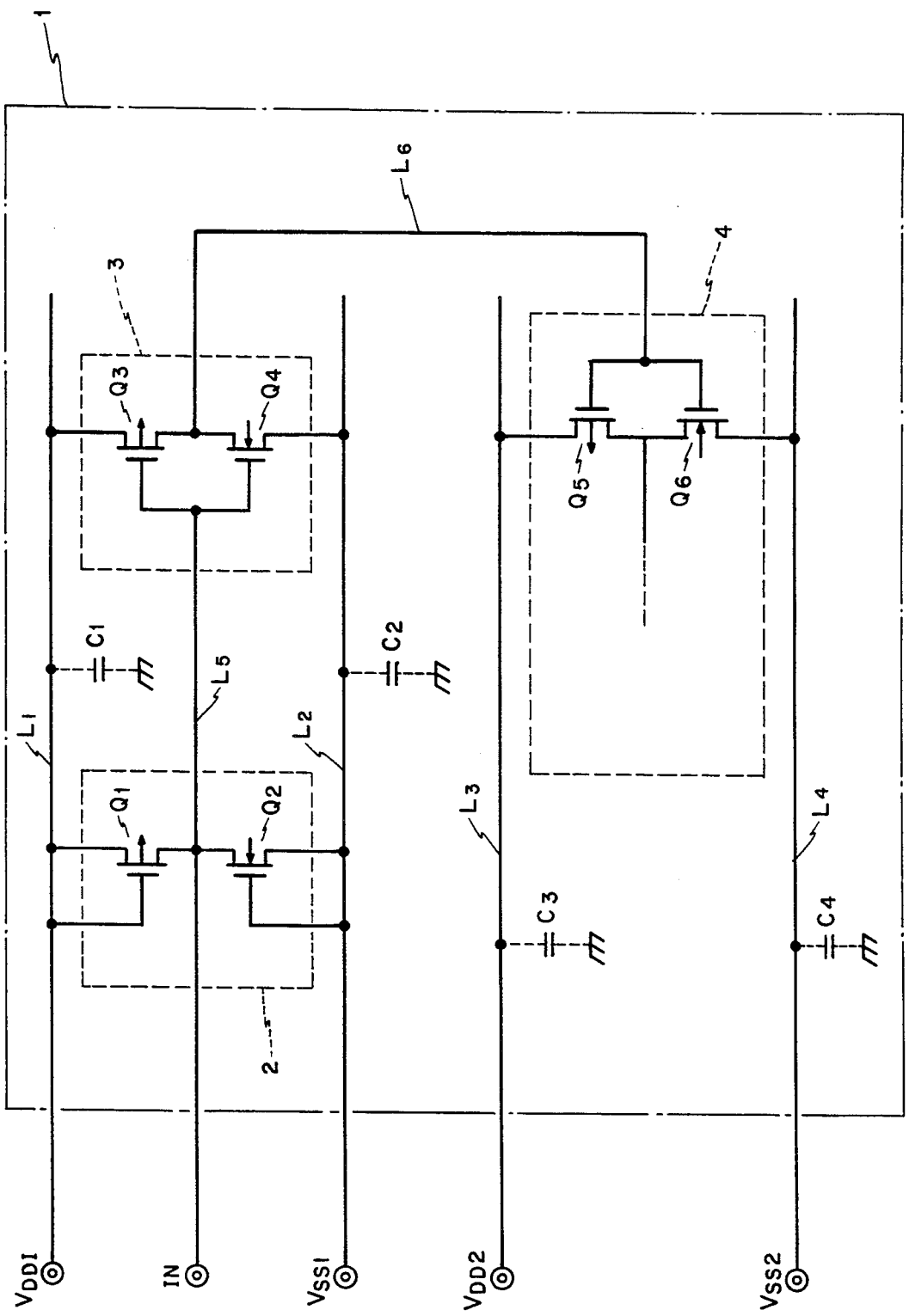
FIG. 1 is a schematic circuit diagram of a MOS integrated circuit in the prior art.

With reference to FIG. 1, the MOS integrated circuit employing the separate power supply structure.

As shown in FIG. 1, the integrated circuit 1 is provided with first and second power source terminal $V_{DD1}$ and $V_{DD2}$ as high voltage terminals and first and second ground terminals $V_{SS1}$ and $V_{SS2}$ as low voltage terminals. High voltage wirings $L_1$ and $L_3$ are connected to the terminals $V_{DD1}$ and $V_{DD2}$, respectively and low voltage wirings $L_2$ and $L_4$ are connected to the terminals $V_{SS1}$ and $V_{SS2}$, respectively. The integrated circuit 1 contains as functional circuits an input first-stage circuit 3 having an N-channel MOS transistor Q4 and a P-channel MOS transistor Q3, an internal circuit including an N-channel MOS transistor Q5, and an input protection circuit 2 having an N-channel transistor Q2 and a P-channel transistor Q1 coupled to an input signal wiring $L_5$. Threshold voltages of transistors Q1 and Q2 are about −15 V and 15 V, respectively.

In this integrated circuit 1, the circuit 3 is energized by the terminals $V_{DD1}$ and $V_{SS1}$ through the wirings $L_1$ and $L_2$, respectively while the circuit 4 is energized by the terminals $V_{DD2}$ and $V_{SS2}$ through the wirings $L_3$ and $L_4$, respectively.

As described above, the power source and ground potential supplied to the input first-stage circuit 3 are separated from the power source and ground supplied to the internal circuit 4 in order that noises in the power source voltage wiring $L_3$ and in the ground voltage wiring $L_4$ caused by the operation of the internal circuit 4 or an output buffer (not shown) will not be transmitted to the input first-stage circuit 3 to deteriorate the input voltage margin of the input first-stage circuit 3 or vice-versa.

The protection circuit 2 includes the MOS transistor Q1 having its source and gate connected to the power source wiring $L_1$ and its drain connected to the input line $L_5$ that connects an input terminal IN (external terminal) to the input portion of the input first-stage circuit 3, and the MOS transistor Q2 having its source and gate connected to the ground wiring $L_2$ and its drain connected to the input wiring $L_5$ together with the drain of the transistor Q1. When a voltage of −15 [V] or lower is applied to the drain with the source as a reference, the transistor Q1 enables the path between the source and the drain to be conductive due to its punch through, and when a voltage of greater than +15 [V] is applied to the drain of Q2 with the source of Q2 as a reference, the transistor Q2 produces the path between its source and its drain due to its punch through phenomena.

When a surge voltage such as positive static electricity is applied to the input terminal IN with the ground terminal $V_{SS1}$ as a reference in the thus constituted conventional protection circuit 2, the surge voltage is discharged as a punch-through current of the transistor Q2 to the ground $V_{SS1}$ via the transistor Q2 and the ground wiring $L_2$. When a negative surge voltage is applied, furthermore, the surge voltage is discharged as a channel current of the transistor Q2 to the ground $V_{SS1}$ via the transistor Q2 and the $L_2$. On the other hand, when a positive surge voltage is applied to the input terminal IN with the terminal $V_{DD1}$ as a reference, the surge voltage is discharged as a channel current of the transistor Q1 to the power terminal $V_{DD1}$ via the transistor Q1 and the wiring $L_1$. When a negative surge voltage is applied, furthermore, the surge voltage is discharged as a punch-through current of the transistor Q1 to the $V_{DD1}$ via the transistor Q1 and the wiring $L_1$. Thus, the surge voltage applied to the input terminal IN is released to the power terminal $V_{DD1}$ and to the $V_{SS1}$ via the transistors Q1 and Q2, in order to prevent the destruction in the gate oxide film and the like of the transistors Q3 and Q4 that constitute the input first-stage circuit 3.

In the above-mentioned conventional protection circuit 2, when a surge voltage is applied to the input terminal IN with the power source $V_{DD2}$ or ground $V_{SS2}$ as a reference under the floating condition where, for example, the power terminal $V_{DD1}$ and ground terminal $V_{SS1}$ are not connected power source and ground potential, the surge voltage is discharged to the power source wiring $L_1$ or to the ground wiring $L_2$ via the transistor Q1 or Q2. However, since the power source wiring $L_1$ and the ground wiring $L_2$ are under the floating condition, the surge electric charge is absorbed in very small amounts corresponding to parasitic capacitances C1 and C2. Furthermore, since there does not exist a current path amount the input terminal IN, the power source $V_{DD2}$ and the ground line $V_{SS2}$, most of the static electricity applied to the input terminal IN is fed to the gates of the transistors Q3 and Q4 of the input initial-stage circuit 3. This results in the destruction of the gate oxide film of the transistors Q3 and Q4 of the input initial-stage circuit 3. Further, the electric charge discharged into the power source wiring $L_1$ and ground wiring $L_2$ via the transistors Q1 and Q2 and accumulated therein, destroys the junction between the substrate and the source of the transistors Q3 and Q4, or destroys the insulating film between the input line $L_5$ and the substrate.

DESCRIPTION OF THE PREFERRED EMBODIMENT

Figure 2:
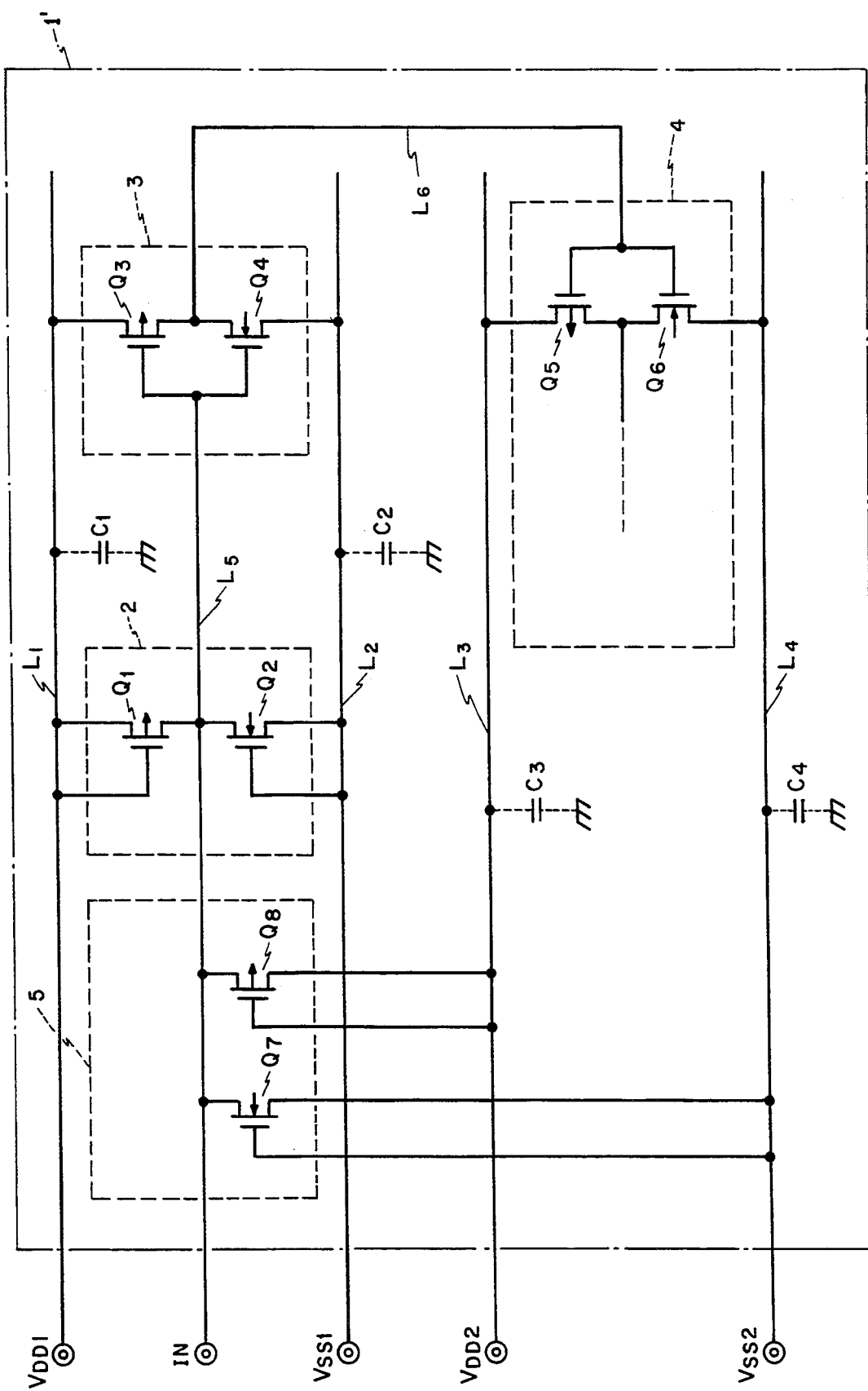
FIG. 2 is a schematic circuit diagram of a MOS integrated circuit according to a preferred embodiment of the present invention.

With reference to FIG. 2, the MOS integrated circuit according to the present invention will be explained. In FIG. 2, the elements or portions corresponding to those of FIG. 1 are denoted by the same references and detailed explanation therefor will be omitted.

The integrated circuit 1' according to this embodiment is obtained by providing an additional protection circuit 5 coupled between the input signal wiring $L_5$ and the wirings $L_3$ and $L_4$ for the circuit 4. The circuit 5 includes a p-channel MOS transistor Q8 and an n-channel MOS transistor Q7 between the input wiring $L_5$, the power source wiring $L_3$ and the ground wiring $L_4$. That is, the source and gate of the transistor Q8 are connected to the power terminal $V_{DD2}$ via the power source wiring $L_3$, and the drain thereof is connected to the input wiring $L_5$ that connects the input terminal IN to the input portion of the input first-stage circuit 3. Further, the source and gate of the n-channel MOS transistor Q7 are connected to the ground terminal $V_{SS2}$ via the ground wiring $L_4$, and the drain thereof is connected to the input line $L_5$ together with the drain of the transistor Q8.

Mentioned below is the operation of the thus constituted circuit according to this embodiment.

The transistors Q1 and Q2 operate similarly to the prior art. That is, a surge voltage such as positive static electricity applied to the input terminal IN with the $V_{DD1}$ or the $V_{SS1}$ as a reference is discharged as a punch-through current of the transistor Q2 for the $V_{SS1}$ or as a channel current of the transistor Q1 for the $V_{DD1}$. Further, the negative surge voltage applied to the input terminal IN is discharged as a channel current of the transistor Q2 for the ground $V_{SS1}$ or as a punch-through current of the transistor Q1 for the $V_{DD1}$. Therefore, the surge voltage applied to the input terminal IN with the $V_{DD1}$ or the $V_{SS1}$ as a reference is suppressed to be smaller than a gate oxide film breakdown voltage of the transistors Q3 and Q4 of the input first-stage circuit 3. Thus, the input first-stage circuit 3 is prevented from being damaged by the surge voltage.

Furthermore, the surge voltage applied to the input terminal IN with the $V_{DD2}$ or the $V_{SS2}$ as a reference is discharged to the $V_{DD2}$ or the $V_{SS2}$ since the transistor Q7 works for the ground $V_{SS2}$ like the transistor Q2 that works for $V_{SS1}$ or the transistor Q8 works for the power source $V_{DD2}$ like the transistor Q1 that works for $V_{DD1}$. Thus, the input first-stage circuit 3 is prevented from being damaged by the surge voltage.

Here, when a surge voltage that is so great that it cannot be released to the power source $V_{DD1}$ or $V_{DD2}$ as the channel current or the punch-through current of the transistor Q1 or Q8, is applied to the input terminal IN with the terminal $V_{DD1}$ or $V_{DD2}$ as a reference, the great excess amount of charges is discharged to the ground wiring $L_2$ or to the ground wiring $L_4$ as the channel current or the punch-through current of the transistor Q2 or Q7. As a result, the potential of the ground wiring $L_2$ or the ground wiring $L_4$ rises. However, the electric charge accumulated in the wiring $L_2$ or in the wiring $L_4$ is discharged to the power source wiring $L_1$ or the power source wiring $L_3$ due to the channel current and punch-through current of the transistors Q3 and Q4 of the input initial-stage circuit 3 connected between the power source wiring $L_1$ and the ground wiring $L_2$ or due to the channel current and punch-through current of the transistors Q5 and Q6 of the internal circuit 4 connected between the power source wiring $L_3$ and the ground wiring $L_4$. With regard to the discharge path from the input terminal IN to the terminals $V_{DD1}$ and $V_{DD2}$, therefore, the transistor Q1 has in parallel therewith a path via the transistor Q8, and the transistor Q2 has in parallel therewith a path via the transistor Q7. When the transistors Q1 and Q8 are not provided, therefore, the electric charge is discharged to the $V_{DD1}$ and $V_{DD2}$ via these paths.

In the same manner, when a surge voltage that is so great that it cannot be released to the ground $V_{SS1}$ or the ground $V_{SS2}$ as the channel current or the punch-through current of the transistor Q2 or Q7, is applied to the input terminal IN with the $V_{SS1}$ or $V_{SS2}$ as a reference, the great excess amount of charges is discharged to the ground $V_{SS1}$ and the ground $V_{SS2}$ through a path that leads from the transistor Q1 to the ground $V_{SS1}$ via the input first-stage circuit 3 or through a path that leads from the transistor Q8 to the ground $V_{SS2}$ via the internal circuit 4.

As will be obvious from the foregoing description, each combination of the transistors Q1 and Q8, transistors Q1 and Q7, transistors Q2 and Q8, or transistors Q2 and Q7, forms a discharge path among the input terminal IN, power sources and grounds, contributing to increasing the surge breakdown voltage. Furthermore, provision of the transistors Q1, Q2 and transistors Q8, Q7 like in this embodiment makes it possible to strikingly improve the discharge performance. Therefore, the surge charge such as static electricity and noise moves quickly, and the power source potential and ground potential and quickly stabilized, making it possible to greatly increase the breakdown voltage against surge such as static electricity.

The threshold voltage and punch-through start voltage of the aforementioned transistors Q1, Q2 and transistors Q7, Q8 can be varied by modifying the manufacturing process to adjust the discharge ability to meet the demand.

According to the present invention, furthermore, it is allowable to suitably increase the number of discharge means that correspond to the MOS transistors Q1, Q2 and transistors Q7, Q8 so as to be adapted to a semiconductor integrated circuit device having any number of power sources and grounds.

According to the present invention as explained above, provision is made of a surge voltage discharge path between the input line that connects the input terminal to the input portion of the input first-stage circuit and at least either the power sources or grounds of pairs of power source lines and ground lines. Therefore, even when a surge voltage is applied to the input terminal with either the power source or the ground as a reference, the surge voltage can be discharged to either the power source or the ground to effectively protect the input first-stage circuit from the surge voltage such as static electricity.

What is claimed is:

1. A semiconductor integrated circuit comprising first and second high power terminals, first and second low power terminals, an external signal terminal, a first circuit block coupled between said first high power terminal and said first low power terminal and energized by a first power voltage supplied therebetween, said first circuit block including a first transistor to be protected which is connected to said external signal terminal, a second circuit block coupled between said second high power terminal and said second low power terminal and energized by a second power voltage supplied therebetween, a first protective element connected between said external signal terminal and said first high power terminal, a second protective element connected between said external signal terminal and said first low power terminal, a third protective element connected between said external signal terminal and said second high power terminal, and a fourth protective element connected between said external signal terminal and said second low power terminal, said first protective element being connected between said external signal terminal and said first high power terminal without an intervention of any one of said second, third and fourth protective elements to operatively discharge electrostatic charges applied to said external signal terminal to said first high power terminal without an intervention of any one of said second, third and fourth protective elements, said second protective element being connected between said external signal terminal and said first low power terminal without an intervention of any one of said first, third and fourth protective elements to operatively discharge electrostatic charges applied to said external signal terminal to said first low power terminal without an intervention of any one of said first, third and fourth protective elements, said third protective element being connected between said external signal terminal and said second high power terminal without an intervention of any one of said first, second and fourth protective elements to operatively discharge electrostatic charges applied to said external signal terminal to said second high power terminal without an intervention of any one of said first, second and fourth protective elements, and said fourth protective element and being connected between said external signal terminal and said second low power terminal without an intervention of any one of said first, second and third protective elements to operatively discharge electrostatic charges applied to said external signal terminal to said second low power terminal without an intervention of any one of said first, second and third protective elements.

2. The integrated circuit according to claim 1, wherein said first protective element comprises a first field effect transistor having a source-drain current path connected between said external signal terminal and said first high power terminal and a gate connected to said first high power terminal, said second protection element comprising a second field effect transistor having a source-drain current path connected between said external signal terminal and said first low power terminal and a gate connected to said first low power terminal, said third protection element comprising a third field effect transistor having a source-drain current path connected between said external signal terminal and said second high power terminal and a gate connected to said second high power terminal, and said fourth protection element including a fourth field effect transistor having a source-drain current path connected between said external signal terminal and second low power terminal and a gate connected to said second low power terminal.

* * * * *